US012732359B2

(12) United States Patent
Nyi Nyi et al.

(10) Patent No.: US 12,732,359 B2
(45) Date of Patent: Sep. 8, 2026

(54) METHOD AND SYSTEM FOR CONVERTING EXISTING COMPUTING DEVICES INTO FAST IDENTITY ONLINE (FIDO) DEVICE ONBOARD (FDO) COMPLIANT COMPUTING DEVICES

(71) Applicant: Dell Products L.P., Round Rock, TX (US)

(72) Inventors: Thwin Nyi Nyi, Singapore (SG); Ravinder Tamishetty, Singapore (SG); Govind Pulikode Mukundan, Singapore (SG); Ashish Mishra, Singapore (SG)

(73) Assignee: Dell Products L.P., Round Rock, TX (US)

( * ) Notice: Subject to any disclaimer, the term of this patent is extended or adjusted under 35 U.S.C. 154(b) by 131 days.

(21) Appl. No.: 18/646,338

(22) Filed: Apr. 25, 2024

(65) Prior Publication Data

US 2025/0337569 A1 Oct. 30, 2025

(51) Int. Cl.
*H04L 9/08* (2006.01)
*H04L 9/32* (2006.01)
*H04L 9/40* (2022.01)

(52) U.S. Cl.
CPC .......... *H04L 9/0877* (2013.01); *H04L 9/3247* (2013.01); *H04L 63/0823* (2013.01)

(58) Field of Classification Search
CPC .. H04L 9/0877; H04L 9/3247; H04L 63/0823
See application file for complete search history.

(56) References Cited

U.S. PATENT DOCUMENTS

2014/0365763 A1* 12/2014 Manohar ................. G06F 21/53 713/156
2023/0325535 A1* 10/2023 Sharma ................... G06F 21/33 726/17

OTHER PUBLICATIONS

Geoffrey Cooper et al., "FIPO Device Onboard Specification 1.1", fido Alliance, <https://fidoalliance.org/specs/FDO/FIDO-Device-Onboard-PS-v1.1-20220419> dated Apr. 19, 2022, accessed on Apr. 22, 2024.

* cited by examiner

*Primary Examiner* — Jeffrey C Pwu
*Assistant Examiner* — Mayasa A. Shaawat
(74) *Attorney, Agent, or Firm* — Chamberlain, Hrdlicka, White, Williams & Aughtry; Aly Z. Dossa

(57) ABSTRACT

A method for onboarding a client includes: sending a request to a global manufacturing service (GMS) module to register the client; receiving a GMS agent from the GMS module; executing the GMS agent on the client to collect a dataset; initiating displaying of the dataset to a user of the client, in which the user signs the dataset to generate a signed dataset; sending the signed dataset to the GMS module, in which, in response to the sending the signed dataset, a device initialization (DI) agent is received from the GMS module; executing the DI agent on the client to collect a second dataset; sending the second dataset to the GMS module, in which, in response to the sending the second dataset, a notification is received; retrieving an ownership voucher (OV); making a determination that the OV comprises the signed dataset; and completing the onboarding of the client.

17 Claims, 8 Drawing Sheets

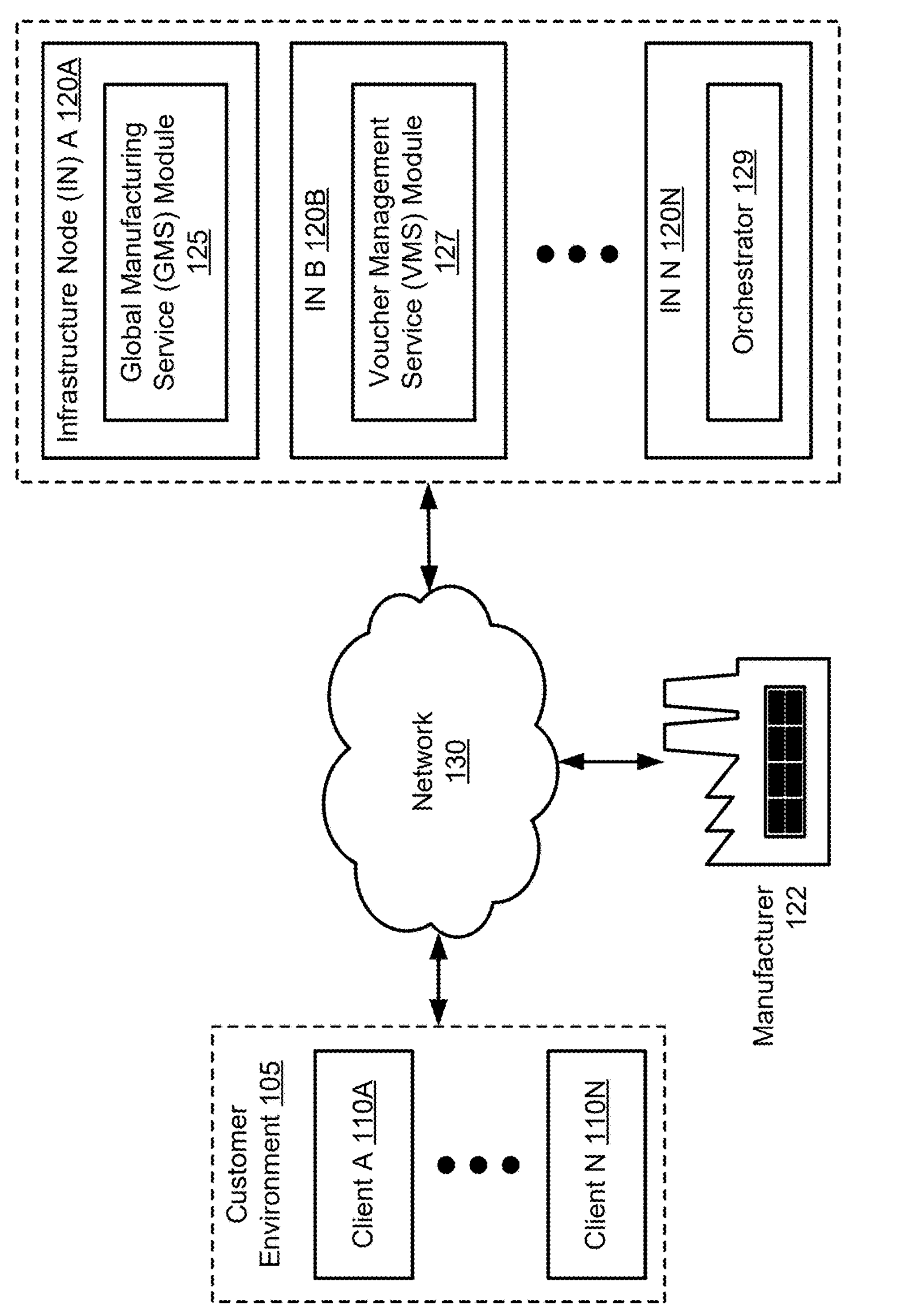
FIG. 1.1

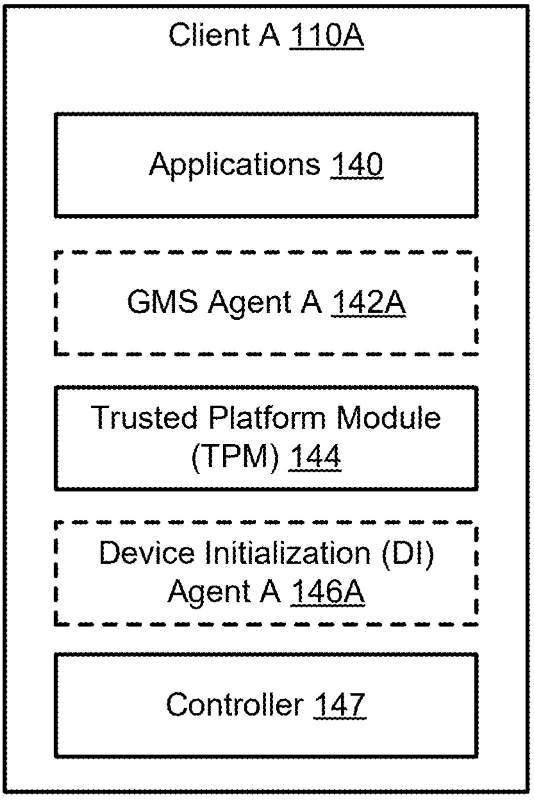
FIG. 1.2

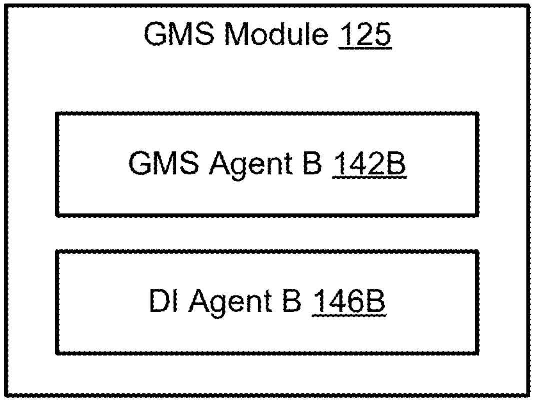
FIG. 1.3

*An example ownership voucher (OV) after DI*
Protocol Version
--
OVHeader
--
OVHeaderHMac: Hmac[DCHmacSecret,OVHeader]
--
OVDevCertificateChain + *Device Inventory Details (Certified)*
--
OVEntryArray
FIG. 2.1
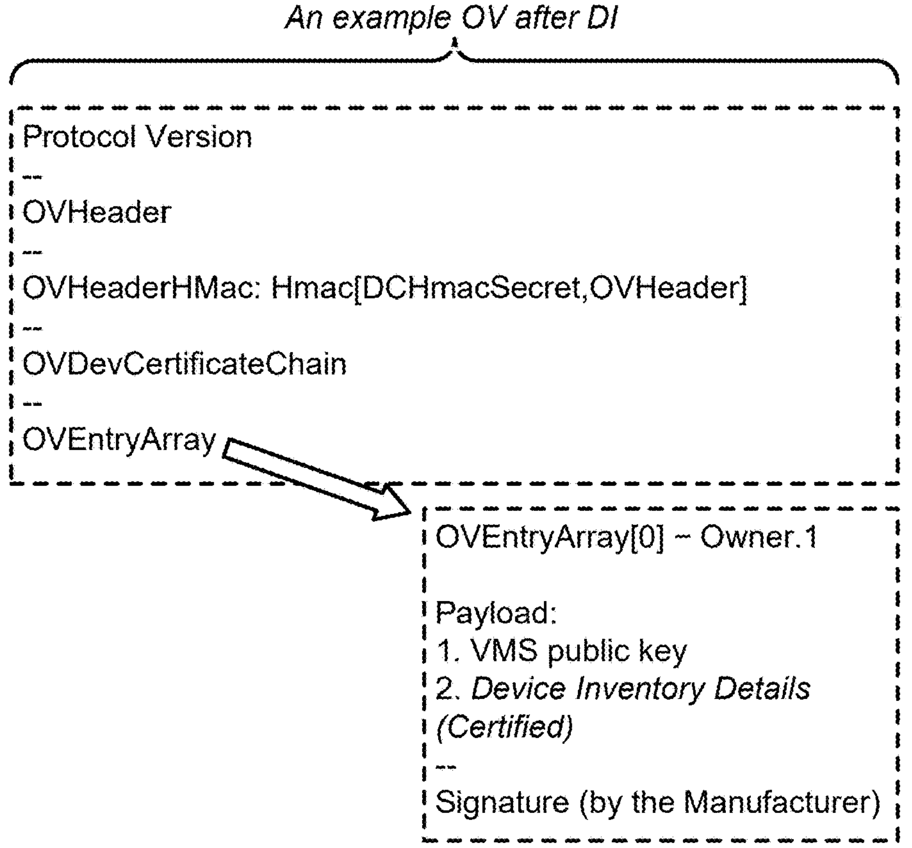
FIG. 2.2

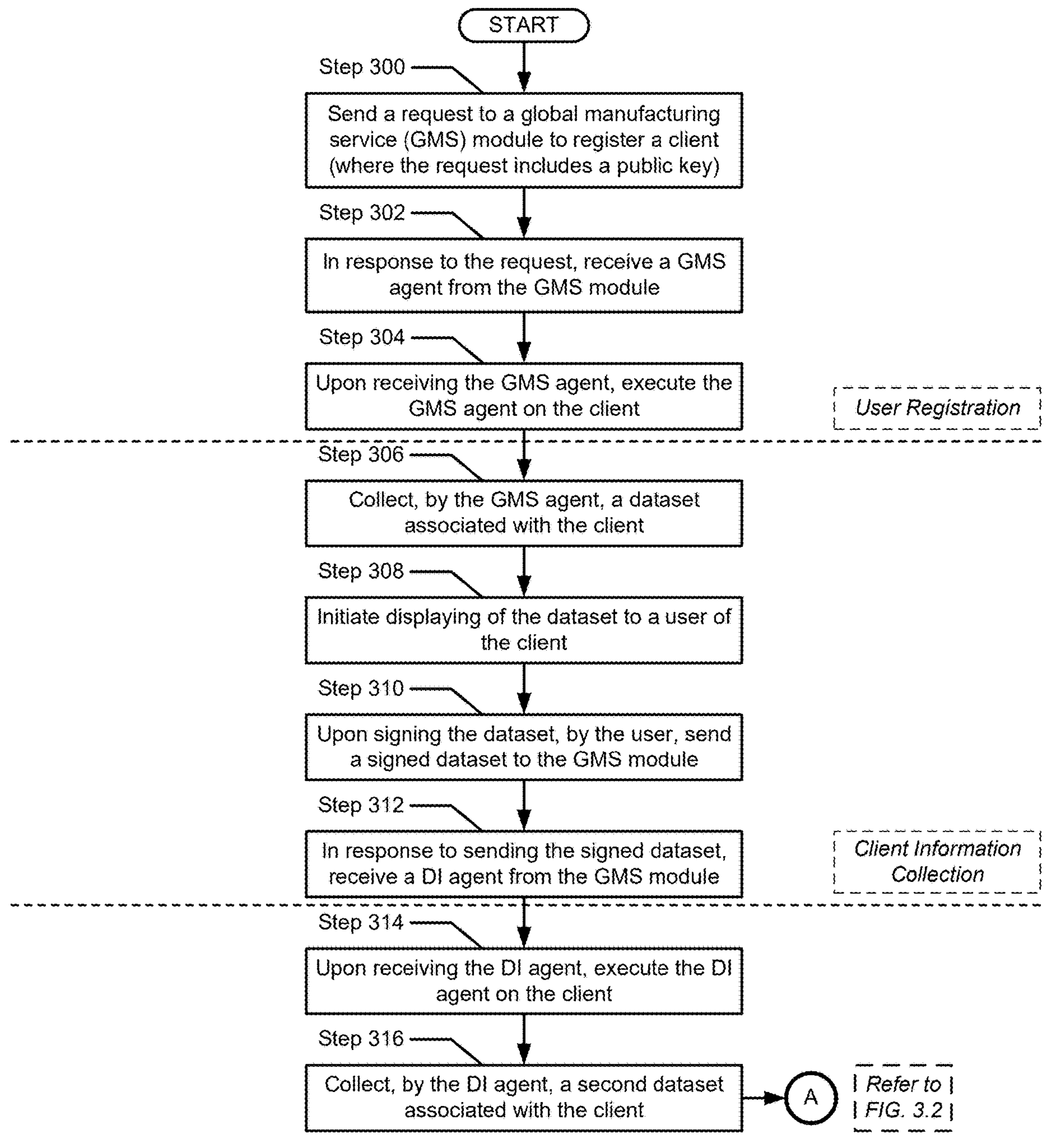
FIG. 3.1

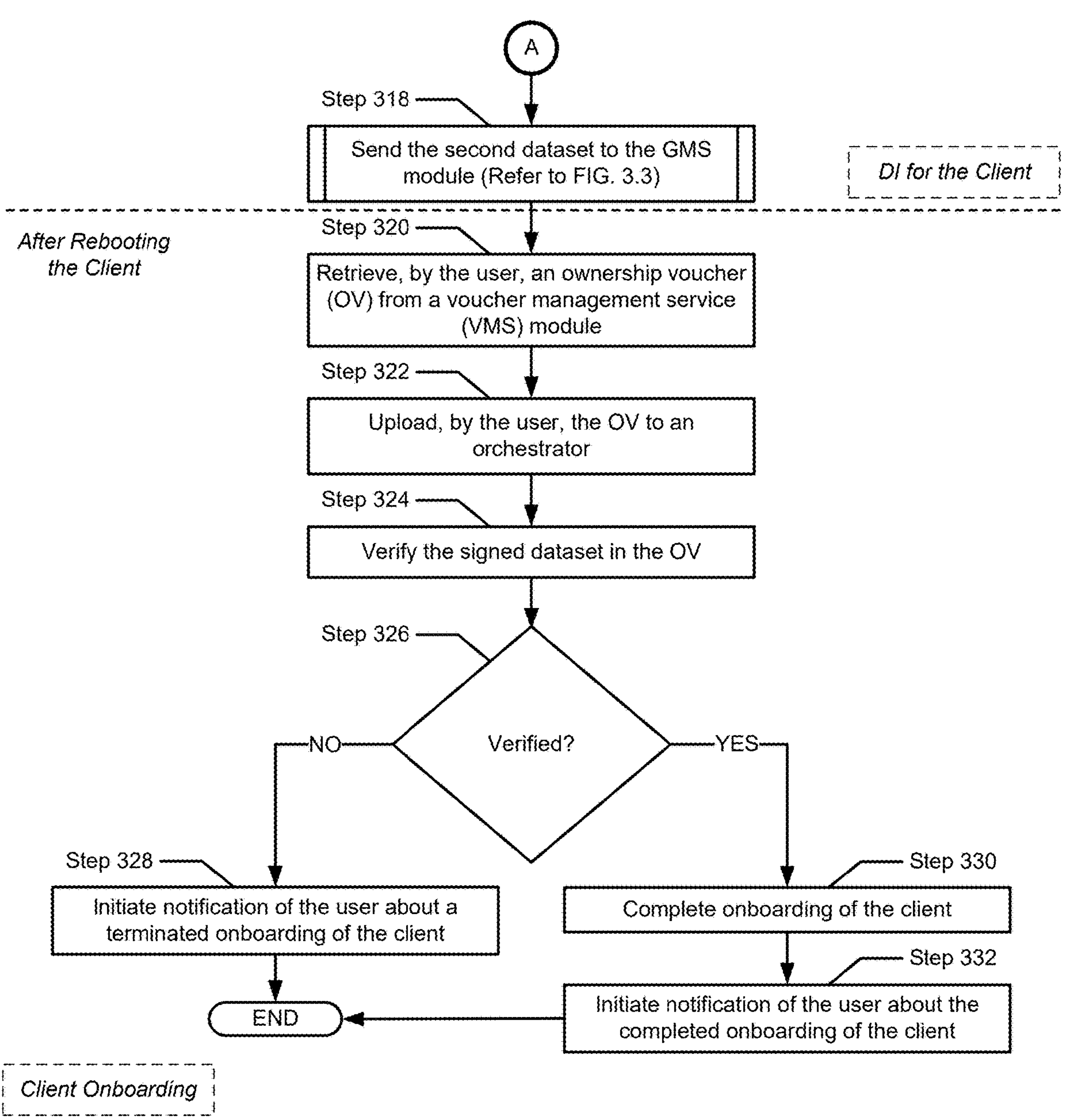
FIG. 3.2

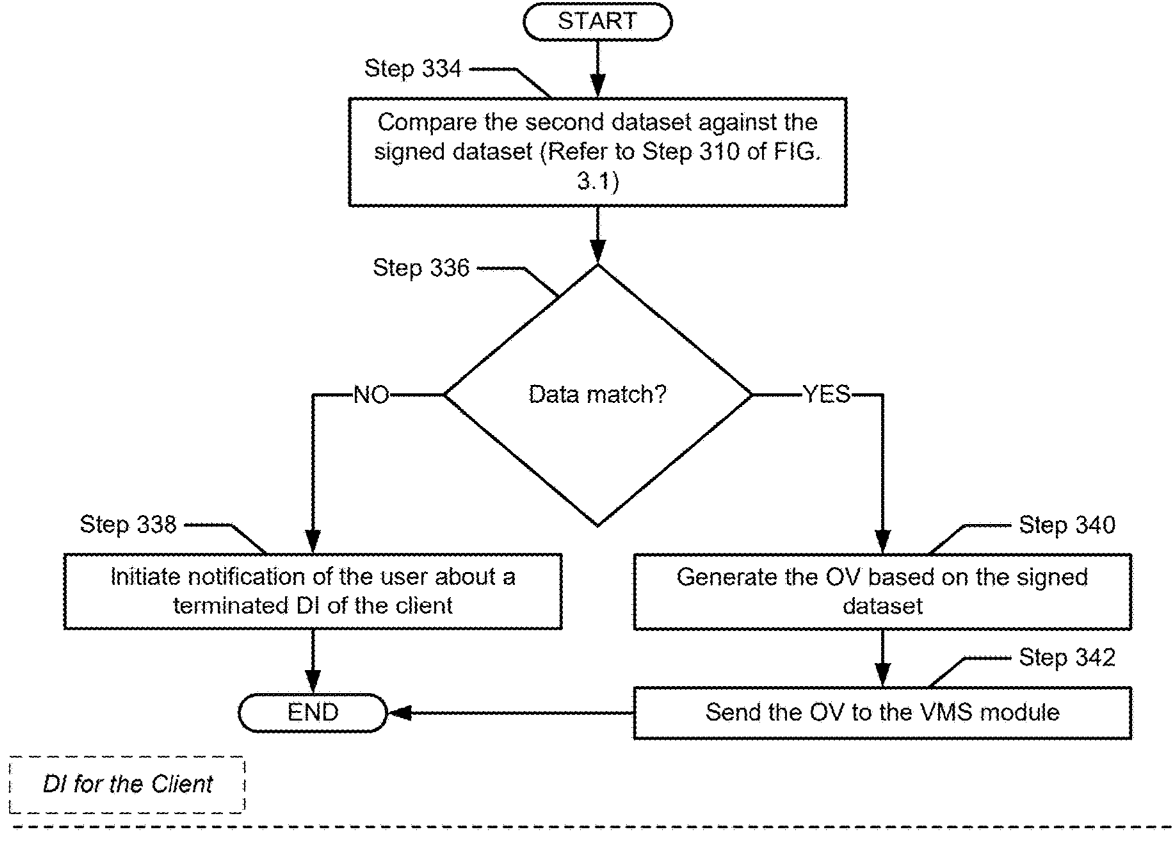
FIG. 3.3

METHOD AND SYSTEM FOR CONVERTING EXISTING COMPUTING DEVICES INTO FAST IDENTITY ONLINE (FIDO) DEVICE ONBOARD (FDO) COMPLIANT COMPUTING DEVICES

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIG. 1.1 shows a diagram of a system in accordance with one or more embodiments disclosed herein.

FIG. 1.2 shows a diagram of a client in accordance with one or more embodiments disclosed herein.

FIG. 1.3 shows a diagram of a global manufacturing service (GMS) module in accordance with one or more embodiments disclosed herein.

FIG. 2.1 shows an example ownership voucher (OV) after the device initialization (DI) of a client in accordance with one or more embodiments disclosed herein.

FIG. 2.2 shows an example OV after the DI of a client in accordance with one or more embodiments disclosed herein.

FIGS. 3.1-3.3 show a method for converting an existing computing device into FIDO device onboard compliant computing device in accordance with one or more embodiments disclosed herein.

DETAILED DESCRIPTION

Figure 4:
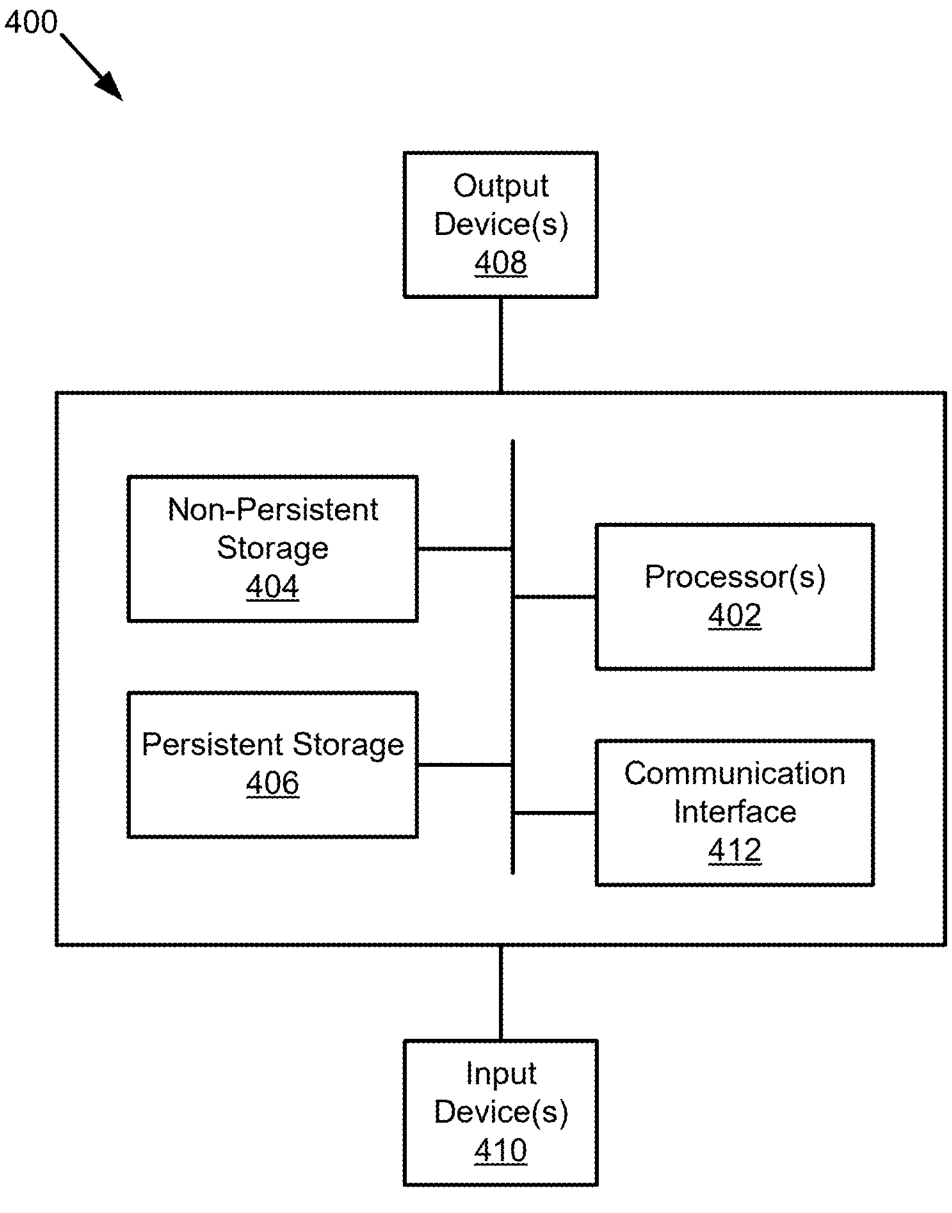
FIG. 4 shows a diagram of a computing device in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

FIDO Device Onboard (FDO) device onboarding is a device onboarding (or a computing device provisioning) scheme/standard/mechanism that is developed by the FIDO Alliance. In general, device onboarding is known as a process of installing secrets and configuration data into a device so that the device is able to connect and interact securely with, for example, an Internet of Things (IoT) platform (e.g., a global server). Various events may trigger device onboarding to take place, but the most common case is when a device is first "unboxed" and installed. The device connects to a corresponding IoT platform over a communication network, with the intent to establish mutual trust and enter an onboarding dialog.

The traditional FDO "device onboarding" process involves a sequential process that starts at a manufacturer and ends at a customer site, which implicitly assumes that a customer will purchase an FDO provisioned device. For example, the traditional FDO process works by establishing the ownership of a device (e.g., an enterprise product) during manufacturing, then tracking the transfer(s) of ownership of the device (e.g., via a corresponding OV) until the device is finally provisioned and put into service. From this perspective, the FDO device onboarding process (or the FDO device onboarding) can be thought of as a device "transfer of ownership" or delegation process. In this example, between when the device is manufactured and when the device is first powered on and given access to the Internet, the device may transfer ownership multiple times, where a structured digital document (e.g., an OV) may be used to transfer digital ownership credentials from a first owner to a second owner without the need to power on the device.

Further, in onboarding, an administrator (e.g., an installer person) may perform the physical installation of a device, where, in an "untrusted installer" model, the device takes no guidance on how to onboard from the installer person who has powered on the device. When the device first powered on, one or more FDO protocols may be invoked and by the protocol cooperation between the device, the new user/owner, and a rendezvous server (e.g., a network server that acts as a rendezvous point between a newly powered on device and an owner onboarding service), the device and new owner may be able to prove themselves to each other (so that the new owner may establish new cryptographic control of the device). When this process is finished, the device may be equipped with credentials supplied by the new owner.

As indicated above, however, the traditional FDO device onboarding does not work for brownfield deployments (said another way, the traditional FDO device onboarding is more suitable for greenfield deployments). For example, in most cases, customers are likely to have existing (non-FDO compliant) devices (at the customer site) that they want to convert into FDO compliant devices, where the traditional FDO device onboarding fails to (i) perform this conversion and (ii) satisfy customer expectations.

For at least the reasons discussed above and without requiring resource-intensive efforts (e.g., time, engineering, etc.), a fundamentally different approach/framework is needed (e.g., a framework that will provision/convert existing (non-FDO compliant) devices into FDO devices (or FDO compliant devices) in a secure and reliable way).

Embodiments disclosed herein relate to methods and systems for converting an existing computing device into FDO compliant computing device. As a result of the processes discussed below, one or more embodiments disclosed herein advantageously ensure that: (i) initial mutual trust between an existing device (or an existing computing device) and a management server (e.g., an orchestrator) for onboarding the device can be established at a customer site (where the device is located); (ii) the identity (e.g., the device identifier, the service tag, the media access control (MAC) information, the serial number, etc.) of an existing device can be captured and verified during the FDO device onboarding and be available later for validation at any point-in-time (e.g., during device onboarding, post onboarding, etc.); (iii) for a better user/customer experience, the framework is provided to customers/users/owners to convert their existing (non-FDO compliant) devices into FDO compliant devices (e.g., by enabling the users to (a) register each of the "existing non-FDO compliant" devices, (b) establish root of trust, and (c) maintain the root of trust throughout the FDO device onboarding); and/or (iv) enable users to use the framework for provisioning (e.g., making FDO compliant), at least, (a) existing devices that are manufactured by the same manufacturer or different manufacturers, (b) replacement/refurbishment devices, (c) resale devices, and (d) devices meant for customer managed solutions.

The following describes various embodiments disclosed herein.

FIG. 1.1 shows a diagram of a system (100) in accordance with one or more embodiments disclosed herein. The system (100) includes a customer environment/site (105) (that includes any number of clients (e.g., Client A (110A), Client N (110N), etc.)), a network (130), any number of infrastructure nodes (INs) (e.g., IN A (120A), IN B (120B), etc.), and a manufacturer (122). The system (100) may include additional, fewer, and/or different components without departing from the scope of the embodiments disclosed herein. Each component may be operably/operatively connected to any of the other components via any combination of wired and/or wireless connections. Each component illustrated in FIG. 1.1 is discussed below.

In one or more embodiments, the clients (e.g., 110A, 110N, etc.), the INs (e.g., 120A, 120B, etc.), and the network (130) may be (or may include) physical hardware or logical devices, as discussed below. While FIG. 1.1 shows a specific configuration of the system (100), other configurations may be used without departing from the scope of the embodiments disclosed herein. For example, although the clients (e.g., 110A, 110N, etc.) and the INs (e.g., 120A, 120B, etc.) are shown to be operatively connected through a communication network (e.g., 130), the clients (e.g., 110A, 110N, etc.) and the INs (e.g., 120A, 120B, etc.) may be directly connected (e.g., without an intervening communication network).

Further, the functioning of the clients (e.g., 110A, 110N, etc.) and the INs (e.g., 120A, 120B, etc.) is not dependent upon the functioning and/or existence of the other components (e.g., devices) in the system (100). Rather, the clients and the INs may function independently and perform operations locally that do not require communication with other components. Accordingly, embodiments disclosed herein should not be limited to the configuration of components shown in FIG. 1.1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of clients (e.g., 110A, 110N, etc.). For example, the system may be configured to organize unbounded, continuously generated data into a data stream. The system (100) may also represent a comprehensive middleware layer executing on computing devices (e.g., 400, FIG. 4) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the INs (e.g., 120A, 120B, etc.)) from the users. By doing so, the users may utilize different computing devices (e.g., 400, FIG. 4) that have different quantities of computing resources (e.g., processing cycles, memory, storage, etc.) while still being afforded a consistent user experience. For example, by performing some computations remotely, the system (100) (*i*) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110N, etc.) may include functionality to, e.g.: (i) capture sensory input (e.g., sensor data) in the form of text, audio, video, touch or motion, (ii) collect massive amounts of data at the edge of an IoT network (where, the collected data may be grouped as: (a) data that needs no further action and does not need to be stored, (b) data that should be retained for later analysis and/or record keeping, and (c) data that requires an immediate action/response), (iii) provide to other entities (e.g., the INs (e.g., 120A, 120B, etc.)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the INs (e.g., 120A, 120B, etc.). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may include any number of applications (and/or content accessible through the applications) that provide computer-implemented services to a user. Applications (e.g., 140, FIG. 1.2) may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications (e.g., 140, FIG. 1.2) may vary in different embodiments, but in certain embodiments, applications may be custom developed or commercial (e.g., off-the-shelf) applications that a user desires to execute in a client (e.g., 110A, 110N, etc.). In one or more embodiments, applications (e.g., 140, FIG. 1.2) may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications (e.g., 140, FIG. 1.2) may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with an IN (e.g., 120A). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN. When the clients interact with the IN, data that is relevant to the clients may be stored (temporarily or permanently) in the IN.

In one or more embodiments, a client (e.g., 110A, 110N, etc.) may be capable of, e.g.: (i) collecting users' inputs, (ii) correlating collected users' inputs to the computer-implemented services to be provided to the users, (iii) communicating with an IN (e.g., 120A) that perform computations necessary to provide the computer-implemented services, (iv) using the computations performed by the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the INs (e.g., 120A, 120B, etc.)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be taken into account without departing from the scope of the embodiments disclosed herein.

Further, in one or more embodiments, a client (e.g., 110A, 110N, etc.) may be implemented as a computing device (e.g., 400, FIG. 4). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application. Additional details of the client are described below in reference to FIG. 1.2.

In one or more embodiments, users (e.g., customers, administrators, people, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 400, FIG. 4) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, an IN (e.g., 120A, 120B, 120N, etc.) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, an IN (e.g., 120A, 120B, 120N, etc.) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to a database for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or machine learning (ML) models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN of the system (100) for review and/or other human interactions; (x) exchange data with other devices registered in/to the network (130) in order to, for example, participate in a collaborative workload placement (e.g., the IN may split up a request (e.g., an operation, a task, an activity, etc.) with another IN, coordinating its efforts to complete the request more efficiently than if the IN had been responsible for completing the request); (xi) provide software-defined data protection for the clients (e.g., 110A, 110N, etc.); (xii) provide automated data discovery, protection, management, and recovery operations for the clients; (xiii) monitor operational states of the clients; (xiv) regularly back up configuration information of the clients to a database; (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or database; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., the IN may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IN (e.g., 120A, 120B, 120N, etc.) may communicate with, for example, a database and/or other storage devices in the system (100).

As described above, an IN (e.g., 120A, 120B, 120N, etc.) may be capable of providing a range of functionalities/services to the users of the clients (e.g., 110A, 110N, etc.). However, not all of the users may be allowed to receive all of the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (e.g., 120A, 120B, 120N, etc.) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (e.g., 120A, 120B, 120N, etc.) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (e.g., 120A, 120B, 120N, etc.) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

Further, while a single IN (e.g., 120A, 120B, 120N, etc.) is considered above, the term "node" includes any collection of systems or sub-systems that individually or jointly execute a set, or multiple sets, of instructions to provide one or more computer-implemented services. For example, a single IN may provide a computer-implemented service on its own (i.e., independently) while multiple other nodes may provide a second computer-implemented service cooperatively (e.g., each of the multiple other nodes may provide similar and or different services that form the cooperatively provided service).

As described above, an IN (e.g., 120A, 120B, 120N, etc.) may provide any quantity and any type of computer-implemented services. To provide computer-implemented services, the IN may be a heterogeneous set, including a collection of physical components/resources configured to perform operations of the IN and/or otherwise execute a collection of logical components/resources of the IN. In one or more embodiments, a resource (e.g., a measurable quantity of a compute-relevant resource type that may be requested, allocated, and/or consumed) may be (or may include), for example (but not limited to): a CPU, a GPU, a DPU, memory, a network resource, storage space (e.g., to store any type and quantity of information), storage input/output, a hardware resource set, a compute resource set (e.g., one or more processors, processor dedicated memory, etc.), a control resource set, etc.

In one or more embodiments, the IN (e.g., 120A, 120B, 120N, etc.) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

In one or more embodiments, resources (or computing resources) of an IN (e.g., 120A, 120B, 120N, etc.) may be divided into three logical resource sets: a compute resource set, a control resource set, and a hardware resource set. Different resource sets, or portions thereof, from the same or different INs may be aggregated (e.g., caused to operate as a computing device) to instantiate a composed IN having at least one resource set from each set of the three resource set model.

In one or more embodiments, a hardware resource set (e.g., of an IN) may include (or specify), for example (but not limited to): a configurable CPU option (e.g., a valid/legitimate vCPU count per-IN option), a minimum user count per-IN, a maximum user count per-IN, a configurable network resource option (e.g., enabling/disabling single-root input/output virtualization (SR-IOV) for specific INs), a configurable memory option (e.g., maximum and minimum memory per-IN), a configurable GPU option (e.g., allowable scheduling policy and/or vGPU count combinations per-IN), a configurable DPU option (e.g., legitimacy of disabling inter-integrated circuit (I2C) for various INs), a configurable storage space option (e.g., a list of disk cloning technologies across all INs), a configurable storage input/output option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QOS) template, a 10 GB/s BW with 10 ms latency QoS template, etc.), a DPU related template (e.g., a 1 GB/s BW vDPU with 1 GB vDPU frame buffer template, a 2 GB/s BW vDPU with 1 GB vDPU frame buffer template, etc.), a GPU related template (e.g., a depth-first vGPU with 1 GB vGPU frame buffer template, a depth-first vGPU with 2 GB vGPU frame buffer template, etc.), a storage space related template (e.g., a 40 GB SSD storage template, an 80 GB SSD storage template, etc.), a CPU related template (e.g., a 1 vCPU with 4 cores template, a 2 vCPUs with 4 cores template, etc.), a memory related template (e.g., a 4 GB DRAM template, an 8 GB DRAM template, etc.), a speed select technology configuration (e.g., enabled, disabled, etc.), a virtual NIC (vNIC) count per-IN, a wake on LAN support configuration (e.g., supported/enabled, not supported/disabled, etc.), a swap space configuration per-IN, a reserved memory configuration (e.g., as a percentage of configured memory such as 0-100%), a memory ballooning configuration (e.g., enabled, disabled, etc.), a vGPU count per-IN, a type of a vGPU scheduling policy (e.g., a "fixed share" vGPU scheduling policy, an "equal share" vGPU scheduling policy, etc.), a type of a GPU virtualization approach (e.g., graphics vendor native drivers approach such as a vGPU), a storage mode configuration (e.g., an enabled high-performance storage array mode, a disabled high-performance storage array mode, an enabled general storage (i.e., co-processor) mode, a disabled general storage mode, etc.), a backup frequency (e.g., hourly, daily, monthly, etc.), etc.

One of ordinary skill will appreciate that an IN (e.g., 120A, 120B, 120N, etc.) may perform other functionalities without departing from the scope of the embodiments disclosed herein. In one or more embodiments, the INs may be configured to perform (in conjunction with other INs) all, or a portion, of the functionalities described in FIGS. 3.1-3.3.

In one or more embodiments, an IN (e.g., 120A, 120B, 120N, etc.) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110N, etc.), the IN (e.g., 120A, 120B, 120N, etc.) may also be implemented as a logical device.

In one or more embodiments, IN A (120A) may host a GMS module (125). Said another way, the GMS module (125) is demonstrated as a part of IN A (120A) (e.g., as deployed to IN A (120A)); however, embodiments disclosed herein are not limited as such. In the embodiments of the present disclosure, the GMS module (125) may be demonstrated as a separate entity from IN A (120A).

In one or more embodiments, IN B (120B) may host a voucher management service (VMS) module (127). Said another way, the VMS module (127) is demonstrated as a part of IN B (120B) (e.g., as deployed to IN B (120B)); however, embodiments disclosed herein are not limited as such. In the embodiments of the present disclosure, the VMS module (127) may be demonstrated as a separate entity from IN B (120B).

In one or more embodiments, IN N (120N) may host an orchestrator (129). Said another way, the orchestrator (129) is demonstrated as a part of IN N (120N) (e.g., as deployed to IN N (120N)); however, embodiments disclosed herein are not limited as such. In the embodiments of the present disclosure, the orchestrator (129) may be demonstrated as a separate entity from IN N (120N).

In one or more embodiments, in order to support the provisioning of existing computing devices (or clients), the GMS module (125) may include functionality to, e.g.: (i) receive/obtain a registration request from a user that wants to register the client (e.g., a user that wants to make the client an FDO compliant client); (ii) in response to the request (received in (i)), provide a GMS agent (e.g., 142A, FIG. 1.2)

to the client; (iii) receive a signed dataset (see FIG. 3.1) from the client; (iv) in response to receiving the signed dataset, provide a DI agent (e.g., 146A, FIG. 1.2) to the client; (v) receive a second dataset (see FIG. 3.2) from the client; (vi) based on (iii) and (v), compare the second dataset against the signed dataset; (vi) based on the comparison performed in (v), make a determination as to whether contents of the second dataset match contents of the signed dataset; (vii) based on the determination made in (vi), initiate notification of a user about a terminated DI of the client; (viii) based on the determination made in (vi), generate, via its voucher generation engine (which is a part of the FDO DI process), an OV (see FIGS. 2.1 and 2.2) based on the signed dataset; (ix) based on (viii), send the OV to the VMS module (127); (x) be able to store a signed dataset (see Step 310 of FIG. 3.1) that is sent by the user (of the client), along with a public key (e.g., a unique digital identifier) that is sent by the client; (xi) be able to validate the signature of the signed dataset at any point-in-time (via the public key provided by the user in (x)); and/or (xii) be able to only continue the FDO DI process if the signature of the signed dataset is valid (said another way, if the signature validation of the signed dataset fails, the GMS module will not continue provisioning of the client). One of ordinary skill will appreciate that the GMS module (125) may perform other functionalities without departing from the scope of the embodiments disclosed herein. The GMS module (125) may be implemented using hardware, software, or any combination thereof. Additional details of the GMS module are described below in reference to FIG. 1.3.

In one or more embodiments, in order to support the provisioning of existing computing devices (or clients), the VMS module (127) may include functionality to, e.g.: (i) receive/obtain an OV from the GMS module (125); (ii) in response to receiving a retrieval request from a user, send the OV to the user; and/or (iii) be able to store one or more OVs (e.g., that are generated at the manufacturer (122)), and allow these OVs to be linked to corresponding users and clients (said another way, the VMS module (127) may record which OV is linked to which user and client).

One of ordinary skill will appreciate that the VMS module (127) may perform other functionalities without departing from the scope of the embodiments disclosed herein. The VMS module (127) may be implemented using hardware, software, or any combination thereof.

In one or more embodiments, in order to support the provisioning of existing computing devices (or clients) and as being a control plane, the orchestrator (129) may include functionality to, e.g.: (i) receive one or more OVs from a user of a client and/or (ii) communicate with the controller (e.g., 147, FIG. 1.2) over a secure "communication" channel. One of ordinary skill will appreciate that the orchestrator (129) may perform other functionalities without departing from the scope of the embodiments disclosed herein. The orchestrator (129) may be implemented using hardware, software, or any combination thereof.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the INs, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the INs through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

In one or more embodiments, the system (100) may also include a database (not shown). The database may provide long-term, durable, high read/write throughput data storage/protection with near-infinite scale and low-cost. The database may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the database may also occupy a portion of a physical storage/memory device or, alternatively, may span across multiple physical storage/memory devices.

In one or more embodiments, the database may be implemented using physical devices that provide data storage services (e.g., storing data and providing copies of previously stored data). The devices that provide data storage services may include hardware devices and/or logical devices. For example, the database may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database may include a memory device (e.g., a dual in-line memory device), in which data is stored and from which copies of previously stored data are provided. As yet another example, the database may include a persistent storage device (e.g., an SSD), in which data is stored and from which copies of previously stored data is provided. As yet another example, the database may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database may store/record unstructured and/or structured data that may include (or specify), for example (but not limited to): an identifier of a user/customer (e.g., a unique string or combination of bits associated with a particular user); a request received from a user (or a user's account); a geographic location (e.g., a country) associated with the user; a timestamp showing when a specific request is processed by an application; a port number (e.g., associated with a hardware component of a client (e.g., 110N)); a protocol type associated with a port number; computing resource details (including details of hardware components and/or software components) and IP address details of an IN (e.g., 120A) hosting an application where a specific request is processed; an identifier of an application (e.g., that is deployed by the manufacturer (122) to the database); information with respect to historical metadata (e.g., system logs, applications logs, telemetry data including past and present device usage of one or more computing devices in the system (100), etc.); computing resource details and an IP address of a client that sent a specific request (e.g., to an IN (e.g., 120A)); one or more points-in-time and/or one or more periods of time associated with a data recovery event; data for execution of applications/services (including IN applications and associated endpoints); corpuses of annotated data used to build/generate and train processing classifiers for trained ML models; linear, non-linear, and/or ML model parameters; an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; a distributed model identifier that uniquely identifies a distributed model; a user activity performed on a data item; a cumulative history of user/administrator activity records obtained over a prolonged period of time; a setting (and a version) of a mission critical application executing on an IN (e.g., 120N); an SLA/SLO set by a user; a data protection policy (e.g., an affinity-based backup policy) implemented by a user (e.g., to protect a local data center, to perform a rapid recovery, etc.); a configuration setting of that policy; product configuration information associated with a client; a number of each type of a set of assets protected by an IN (e.g., 120N); a size of each of the set of assets protected; a number of each type of a set of data protection policies implemented by a user; configuration information associated with an IN (e.g., 120A) (to manage security, network traffic, network access, or any other function/operation performed by the IN); a job detail of a job (e.g., a data protection job, a data restoration job, a log retention job, etc.) that has been initiated by an IN (e.g., 120A); a type of the job (e.g., a non-parallel processing job, a parallel processing job, an analytics job, etc.); information associated with a hardware resource set (discussed above) of an IN (e.g., 120A); a completion timestamp encoding a date and/or time reflective of a successful completion of a job; a time duration reflecting the length of time expended for executing and completing a job; a backup retention period associated with a data item; a status of a job (e.g., how many jobs are still active, how many jobs are completed, etc.); information regarding an administrator (e.g., a high priority trusted administrator, a low priority trusted administrator, etc.) related to an analytics job; a workflow (e.g., a policy that dictates how a workload should be configured and/or protected, such as an SQL workflow dictates how an SQL workload should be protected) set (by a user); a type of a workload that is tested/validated by an administrator per data protection policy; a practice recommended by the manufacturer (122) (e.g., a single data protection policy should not protect more than 100 assets; for a dynamic NAS, maximum one billion files can be protected per day, etc.); one or more device state paths corresponding to a device (e.g., a client); an existing knowledge base (KB) article; a technical support history documentation of a customer/user; a port's user guide; a port's release note; a community forum question and its associated answer; a catalog file of an application upgrade; details of a compatible OS version for an application upgrade to be installed; an application upgrade sequence; a solution or a workaround document for a software failure; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/customer experience; etc.

In one or more embodiments, metadata (e.g., system logs, application logs, etc.) may be obtained (or dynamically fetched) as they become available (e.g., with no user manual intervention), or by an analyzer (not shown) of an IN (e.g., 120A, 120B, 120N, etc.) polling a corresponding client (e.g., 110A) (by making schedule-driven/periodic application programming interface (API) calls to the client without affecting the client's ongoing production workloads) for newer metadata. Based on receiving the API calls from the analyzer, the client may allow the analyzer to obtain the metadata.

In one or more embodiments, the metadata may be obtained (or streamed) continuously as they generated, or they may be obtained in batches, for example, in scenarios where (i) the analyzer receives a metadata analysis request (or a heath check request for a client), (ii) another IN of the system (100) accumulates the metadata and provides them to the analyzer at fixed time intervals, or (iii) the database stores the metadata and notify the analyzer to access the metadata from the database. In one or more embodiments, metadata may be access-protected for transmission from a corresponding client (e.g., 110A) to the analyzer, e.g., using encryption.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the database, any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by the manufacturer (122)) and/or by the administrators based on, for example, newer (e.g., updated) versions of external information. The unstructured and/or structured data may also be updated when, for example (but not limited to): newer system logs are received, a state of an IN (e.g., 120A) is changed, etc.

While the database has been illustrated and described as including a limited number and type of data, the database may store additional, less, and/or different data without departing from the scope of the embodiments disclosed herein. One of ordinary skill will appreciate that the database may perform other functionalities without departing from the scope of the embodiments disclosed herein.

In one or more embodiments, as being a trusted facility/site, the manufacturer (122) may be part of a supply chain route (that may be traversed by an enterprise product), in which the supply chain route may outline a sequence of trusted sites through which the enterprise product transitions during its lifetime.

In one or more embodiments, the manufacturer (122) may reference a trusted facility where a supplier of an enterprise product (e.g., a physical product such as a client, a logical product such as a software program or an application, etc.) may manufacture the enterprise product in part or in entirety. Manufacturing of an enterprise product may include one or more steps/stages, for example (but not limited to): steps of a developer/administrator flow of an application; steps of generating an OV (based on the credentials specified in the DI protocol (e.g., applied by a DI agent (e.g., 146B, FIG. 1.3))) (where the OV may not be stored in the corresponding client; instead, the OV may be transmitted along the supply chain route to mirror the client's progress); steps of initial provisioning of a client; steps of generating a public and private key pair for a client (before shipping the client to a user/customer), where the public key of the key pair is embedded into a corresponding OV; manufacturing of chassis and front panel parts; subassembly of chassis parts to obtain a chassis; integration of a chassis and front panel parts to obtain a chassis enclosure; procurement of a power supply and/or cables and/or a backplane; integration of a power supply and/or cables and/or a backplane into a chassis enclosure; procurement of a baseboard and integration thereof into a chassis enclosure; procurement of one or more expansion cards and integration thereof into a chassis enclosure; procurement of one or more storage devices and integration thereof into a chassis enclosure; procurement of computer processors (e.g., CPUs, DPUs, etc.) as well as computer memory and integration thereof into a chassis enclosure to obtain a fully-assembled enterprise product; installation of an OS, zero or more software applications, and/or firmware onto a fully-assembled enterprise product to obtain a fully-integrated enterprise product; etc.

In one or more embodiments, the aforementioned enterprise product manufacturing steps may be performed across one or many manufacturers. Further, the manufacturer (122) may include functionality to service, upgrade, troubleshoot, test, package, and/or distribute various different enterprise products. One of ordinary skill will appreciate that the manufacturer (122) may perform other functionalities without departing from the scope of the embodiments disclosed herein.

While FIG. 1.1 shows a configuration of components, other system configurations may be used without departing from the scope of the embodiments disclosed herein.

Turning now to FIG. 1.2, FIG. 1.2 shows a diagram of a client (e.g., Client A (110A)) described in FIG. 1.1 in accordance with one or more embodiments disclosed herein. Client A (110A) includes any number of applications (140), a GMS agent (e.g., GMS Agent A (142A)), a trusted platform module (TPM) (144), a DI agent (e.g., DI Agent A (146A)), and a controller (147). Client A (110A) may include additional, fewer, and/or different components without departing from the scope of the embodiments disclosed herein. Each component may be operably connected to any of the other component via any combination of wired and/or wireless connections. Each component illustrated in FIG. 1.2 is discussed below.

In one or more embodiments, an application of applications (140) is software (or a software program) that may include instructions (e.g., data, implementation details, code, etc.) which, when executed by a processor of Client A (110A), initiate the performance of one or more operations/services, for example, to be delivered to a user of Client A (110A). Details of an application of the applications are described above in reference to FIG. 1.1. One of ordinary skill will appreciate that the application may perform other functionalities without departing from the scope of the embodiments disclosed herein.

In one or more embodiments, in response to receiving a related request from the controller (147), the GMS module (e.g., 125, FIG. 1.1) may deploy GMS Agent A (142A) to Client A (110A) (which is why GMS Agent A (142A) is illustrated with dashed lines).

In one or more embodiments, GMS Agent A (142A) may include functionality to, e.g.: (i) execute on a client (e.g., Client A (110A)) that a user wants to make an FDO compliant device; and/or (ii) upon deployed to the client, collect/obtain a dataset (e.g., client specific inventory data that serves as a signature of the client to uniquely identify the client, see Step 306 of FIG. 3.1) associated with the client.

One of ordinary skill will appreciate that GMS Agent A (142A) may perform other functionalities without departing from the scope of the embodiments disclosed herein. GMS Agent A (142A) may be implemented using hardware (e.g., a physical device including circuitry), software, or any combination thereof.

In one or more embodiments, the TPM (144) may include functionality to, e.g.: (i) generate, store, transmit, and/or reliably delete/discard "cryptographic" keys, for example, to perform key related operations (e.g., the TPM may send/publish and receive secret blobs (including public keys, endorsement keys, key values, hashes, and/or other data) to and from a global management module (e.g., the orchestrator (e.g., 129, FIG. 1.1))); (ii) being a proxy variant of the global management module (e.g., a local instance of the global management module), host at least an endorsement key and a certificate of authenticity for the endorsement key (e.g., a TPM endorsement key certificate) related to a corresponding client; (iii) receive/obtain one or more previously sent keys/secrets from the global management module; (iv) include a random number generator to generate keys for use (a) in encrypting data items (e.g., data and/or keys) so that users (of the client) may manage their own symmetric keys (including key values) or (b) in decrypting data items that are retrieved from the global management module; (v) perform data protection related (or key related) operations (e.g., key policy operations, key introduction operations, re-keying operations (may be mandatory when a public key reaches its maximum age so that data security may be kept at a maximum level and a collective or an average key age may be kept below a predetermined age), managing existing keys, deleting older keys, etc.), in which (a) the key related operations may be used to manage how data is encrypted or decrypted, (b) the associated policies may determine when keys are introduced, how many keys are allowed, when data is re-keyed, and the like, and (c) the aforementioned operations may be independent of each other and may be performed asynchronously or synchronously; (vi) generate one or more pre-encrypted keys (e.g., to encrypt a data chunk) by employing a key encryption algorithm to generate a random number as it would to generate any other secret key; (vii) ensure that data and/or keys received from the global management module are not get unwrapped (e.g., decrypted) outside of a secure region (within the client) in order to improve security of data and/or keys; (viii) ensure that, before deleting a specific key (e.g., a user-defined symmetric key), no data is still encrypted with that specific key; (ix) perform different encryption mechanisms/models (e.g., a "convergent encryption" mechanism; "encryption at rest" mechanism; a set of linear, non-linear, and/or ML based data encryption models; etc.) to encrypt data and/or keys; (x) based on a hash value of a unique data chunk, generate a key associated with the unique data chunk (e.g., perform one or more hash operations on a data chunk to generate a symmetric key); (xi) initiate notification of a corresponding user (of the client) about the completion of an encryption/decryption process (via a GUI of the client); (xii) perform different decryption mechanisms/models (e.g., a "convergent decryption" mechanism; "decryption at rest" mechanism; a set of linear, non-linear, and/or ML based data encryption models (e.g., a decryption model based on the XTS mode (Tweak=Address)); etc.) to decrypt encrypted data and/or keys; (xiii) include a network interface/apparatus that provides in-band and/or out-of-band connection to communicate and/or interface with other devices, services, and components of the system (e.g., 100, FIG. 1); and/or (xiv) store immutable entries (where each entry may specify an agreement between two entities and, optionally, an indication about whether the agreement was fulfilled or not).

One of ordinary skill will appreciate that the TPM (144) may perform other functionalities without departing from the scope of the embodiments disclosed herein. The TPM (144) may be implemented using hardware, software, or any combination thereof.

In one or more embodiments, in response to receiving a signed dataset from the controller (147), the GMS module (e.g., 125, FIG. 1.1) may deploy DI Agent A (146A) to Client A (110A) (which is why DI Agent A (146A) is illustrated with dashed lines).

In one or more embodiments, DI Agent A (146A) may include functionality to, e.g.: (i) execute on a client (e.g., Client A (110A)) that a user wants to make an FDO compliant device; (ii) perform the FDO DI (or the FDO DI protocol) communication with the GMS module (e.g., 125, FIG. 1.1); (iii) upon deployed to the client, collect/obtain a second dataset (e.g., client specific inventory data, see Step 316 of FIG. 3.1) associated with the client; and/or (iv) send the second dataset to the GMS module (for validation against the GMS module's records).

In one or more embodiments, the FDO DI protocol may be a non-normative protocol that executes within the manufacturer (e.g., 122, FIG. 1.1) when a new computing device (e.g., a new client) is built/manufactured. The DI protocol's function is to embed the ownership and manufacturing credentials (e.g., initialization keys, FDO credentials, etc.) into the newly generated device's restricted operating environment (e.g., the device's TPM). This prepares the device and establishes the first chain for generating a corresponding OV with which to transfer ownership of the device (e.g., before the device can be used for FDO onboarding, the device must be provisioned to embed the ownership and manufacturing credentials into the device). Said another way, the output of employing the DI protocol is an OV, which can be used to establish device ownership during a transfer ownership protocol 2 (TO2).

The DI protocol assumes that the protocol will be executed in a safe "manufacturing" environment and, because of that, the DI protocol employs a trust on first use (TOFU) model. Further, the DI protocol ensures that an initial "FDO" OV includes a means to trust to the device (via, for example, an embedded device certificate chain or Intel® Enhanced Privacy ID (EPID)). As used herein, an embedded device certificate chain or Intel® EPID may be used for attestation during FDO device onboarding. For example, attestation via Intel® EPID associates only a group identify with transfer of ownership, without allowing device correlation to a rendezvous server or to anyone monitoring Internet traffic at the rendezvous server. As yet another example, Intel® EPID may be used to prove the manufacturer to a prospective owner/user without identifying the device.

In one or more embodiments, in conjunction with the controller (147), DI Agent A (146A) may prepare Client A (110A) for the FDO device onboarding. To this end, DI Agent A (146A) may employ a transfer ownership protocol 0 (TO0), where DI Agent A (146A) may indicate its intention and prove it is capable of taking control of Client A's (110A) FDO device onboarding (for example, based on Client A's current globally unique identifier (GUID)). After the TO0 is applied, DI Agent A (146A) may notify the controller (147) that the TO0 is completed (and then Client A (110A) may be rebooted).

Thereafter, the controller (147) (in conjunction with the TPM (144)) may apply a transfer ownership protocol 1 (TO1) (which is a mirror image of the TO0, occurring at Client A (110A)) and the TO2 (where, after mutual trust is proven (via client/device attestation and corresponding OV) and a secure channel is established between the controller and the orchestrator (e.g., 129, FIG. 1.1), key-value pairs are exchanged to provision secrets, data, and/or commands) to complete onboarding of Client A (110A). After that, the controller (147) may (i) replace all FDO credentials, (ii) build a hash-based message authentication code (HMAC) to allow the user to generate, for example, a replacement ownership proxy to be used for resale, and (iii) replace Client A's current GUID (which is for one FDO transfer of ownership only) so that Client A has no memory of that GUID.

One of ordinary skill will appreciate that DI Agent A (146A) may perform other functionalities without departing from the scope of the embodiments disclosed herein. DI Agent A (146A) may be implemented using hardware, software, or any combination thereof.

One of ordinary skill will appreciate that the controller (147) may perform other functionalities without departing from the scope of the embodiments disclosed herein. The controller (147) may be implemented using hardware, software, or any combination thereof.

Turning now to FIG. 1.3, FIG. 1.3 shows a diagram of the GMS module (125) in accordance with one or more embodiments disclosed herein. The GMS module (125) includes a GMS agent (or a device registration client) (e.g., GMS Agent B (142B)) and a DI agent (e.g., DI Agent B (146B)). The GMS module (125) may include additional, fewer, and/or different components without departing from the scope of the embodiments disclosed herein. Each component may be operably connected to any of the other component via any combination of wired and/or wireless connections. Each component illustrated in FIG. 1.3 is discussed below.

In one or more embodiments, GMS Agent B (142B) may provide less, the same, or more functionalities and/or services compared to GMS Agent A (142A) described above in reference to FIG. 1.2. In one or more embodiments, the GMS module (125) may not use GMS Agent B (142B) to provide its computer-implemented services (to users of the clients and/or components of the system (e.g., 100, FIG. 1.1)), which means that the GMS module (125) may only host GMS Agent B (142B) to deploy to a corresponding client (when necessary).

One of ordinary skill will appreciate that GMS Agent B (142B) may perform other functionalities without departing from the scope of the embodiments disclosed herein. GMS Agent B (142B) may be implemented using hardware, software, or any combination thereof.

In one or more embodiments, DI Agent B (146B) may provide less, the same, or more functionalities and/or services compared to DI Agent A (146A) described above in reference to FIG. 1.2. In one or more embodiments, the GMS module (125) may not use DI Agent B (146B) to provide its computer-implemented services (to users of the clients and/or components of the system (e.g., 100, FIG. 1.1)), which means that the GMS module (125) may only host DI Agent B (146B) to deploy to a corresponding client (when necessary).

One of ordinary skill will appreciate that DI Agent B (146B) may perform other functionalities without departing from the scope of the embodiments disclosed herein. DI Agent B (146B) may be implemented using hardware, software, or any combination thereof.

Turning now to FIG. 2.1, FIG. 2.1 shows an example OV (e.g., a structured digital document that provides a user/owner with credentials to take ownership of a client, an FDO OV, a structured digital document that links a manufacturer of a client and a user of the client, etc.) after DI (of a client (e.g., Client A (110A), FIG. 1.2) that a user wants to make FDO compliant) in accordance with one or more embodiments disclosed herein.

Referring to FIG. 2.1, the example OV may include (or specify), at least: "Protocol Version"; "OVHeader" (or "OVHeaderTag"); "OVHeaderHMac: Hmac [DCHmacSecret, OVHeader]" (which additionally requires ensured confidentiality), "OVDevCertificateChain"+"Device Inventory Details (Certified)"; "OVEntry Array"; an authenticated public key of a client/device key pair (not shown) that was generated during the DI of the client (where the public key was authenticated by the manufacturer (e.g., 122, FIG. 1.1)); one or more details that show who is the owner of the client; etc.

As indicated above, the certified device inventory details of the client (a signed dataset which has been certified by a corresponding user private key, see Step 310 of FIG. 3.1) is added/concatenated to "OVDevCertificateChain" of the example OV.

In one or more embodiments, the example OV shown in FIG. 2.1 may be formed as a chain of signed public keys, each signature of a public key authorizing the possessor of the corresponding private key to take ownership of the client or pass ownership through another link in the chain. Further, the example OV shown in FIG. 2.1 may only be maintained for the purposes of connecting a particular client to its particular first owner. The entities involved (in the corresponding FDO device onboarding) may switch the key pairs they use to sign the OV from time to time, make it more difficult for potential attackers to use the OV, for example, as a means to map out the flow of devices from the manufacturer to implementation. In one or more embodiments, the example OV shown in FIG. 2.1 may be stored as a persistent message to be used in the TO0 and TO2.

Turning now to FIG. 2.2, FIG. 2.2 shows an example OV after DI (of a client (e.g., Client A (110A), FIG. 1.2) that a user wants to make FDO compliant) in accordance with one or more embodiments disclosed herein.

Referring to FIG. 2.2, the example OV may include (or specify), at least: "Protocol Version"; "OVHeader" (or "OVHeaderTag"); "OVHeaderHMac: Hmac [DCHmacSecret, OVHeader]" (which additionally requires ensured confidentiality), "OVDevCertificateChain"; "OVEntryArray"; an authenticated public key of a client/device key pair (not shown) that was generated during the DI of the client (where the public key was authenticated by the manufacturer (e.g., 122, FIG. 1.1)); one or more details that show who is the owner of the client; etc.

As indicated above, the certified device inventory details of the client is added as an entry to "OVEntryArray" of the example OV, in which the entry "OVEntry Arry [0]-Owner.1" may include, at least, a payload (including a VMS public key and certified device inventory details) and a manufacturer's signature.

In one or more embodiments, the example OV shown in FIG. 2.2 may be formed as a chain of signed public keys, each signature of a public key authorizing the possessor of the corresponding private key to take ownership of the client or pass ownership through another link in the chain. Further, the example OV shown in FIG. 2.2 may only be maintained for the purposes of connecting a particular client to its particular first owner. The entities involved (in the corresponding FDO device onboarding) may switch the key pairs they use to sign the OV from time to time, make it more difficult for potential attackers to use the OV, for example, as a means to map out the flow of devices from the manufacturer to implementation. In one or more embodiments, the example OV shown in FIG. 2.2 may be stored as a persistent message to be used in the TO0 and TO2.

FIGS. 3.1-3.3 show a method for converting an existing computing device (e.g., Client A (110A), FIG. 1.2) into FDO compliant computing device in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 3.1, the method shown in FIG. 3.1 may be executed by, for example, the above-discussed controller (e.g., 147, FIG. 1.2), GMS agent (e.g., 142A, FIG. 1.2), and DI agent (e.g., 146A, FIG. 1.2). Other components of the system (100) illustrated in FIG. 1.1 may also execute all or part of the method shown in FIG. 3.1 without departing from the scope of the embodiments disclosed herein.

Referring to FIG. 3.1, Steps 300-304 show the "user registration" stage of the method.

In Step 300, the controller receives a request from a requesting entity (e.g., a user via a user terminal, an application, etc.) that wants to (i) make the client an FDO compliant client and (ii) generate an account with the GMS module (e.g., 125, FIG. 1.1), in which the request includes at least a public key (that is to be used (by the GMS module) to verify a signed dataset (see Step 310)).

In response to receiving the request, as part of that request, and/or in any other manner (e.g., before initiating any computation with respect to the request), the controller invokes the GMS module to communicate with the GMS module. After receiving the GMS module's confirmation, the controller sends the request (along with the public key (including at least a unique digital identifier associated with the client)) to the GMS module to register the client.

In Step 302, in response to the request, the controller receives a GMS agent from the GMS module. In one or more embodiments, the GMS module may send the GMS agent as an optical disc image (or an ISO image). In Step 304, upon receiving the GMS agent, the controller executes the GMS agent on the client.

Referring to FIG. 3.1, Steps 306-312 show the "client information collection" stage of the method.

In Step 306, the GMS agent collects a dataset associated with the client. In one or more embodiments, the dataset may include (or specify), for example (but not limited to): an identifier of a hardware component or software component; a port number of a hardware component; a protocol type associated with a port number; a TPM endorsement key certificate associated with the client; a serial number of the client; complete hardware inventory information/details of the client; computing resource details of the client; IP address details of the client; an identifier of a sensor; MAC information of the client; a product identifier of the client; a type of the client; product configuration information associated with the client; information associated with a hardware resource set (described above in reference to FIG. 1.1) of the client; an identifier of the client's manufacturer; a type of a file system (e.g., a new technology file system (NTFS), a resilient file system (ReFS), etc.) being executed on the client; a version of an OS being executed on the client; a display resolution configuration of the client; one or more inventory certificates associated with the client; an identifier of a storage device; an input/output memory management unit configuration of a second storage device; an identifier of a DPU; an identifier of a NIC; etc.

Thereafter, the GMS agent provides the dataset to the controller.

In Step 308, the controller initiates, via a GUI of the client, displaying of the dataset to the user of the client (who wanted to generate an account with the GMS module in Step 300). In Step 310, the user signs (and optionally encrypts) the dataset (i) to generate a signed dataset and (ii) to attest that information included in the signed dataset is accurate (and can be used to provision the client (or to make the client an FDO compliant client)). In one or more embodiments, the user may sign the dataset using a private key pair of the public key that is sent to the GMS module in Step 300 (to verify the signed dataset at a later point-in-time). Thereafter, the user, via the controller, sends the signed dataset to the GMs module.

In Step 312, in response to sending the signed dataset, the controller receives a DI agent from the GMS module. In one or more embodiments, the GMS module may send the DI agent as an optical disc image (or an ISO image).

Referring to FIGS. 3.1-3.3, Steps 314-318 and 334-342 show "DI for the client" stage of the method. In one or more embodiments, after receiving the DI agent in Step 312, Steps 314-342 may be performed at a later point-in-time (e.g., depending on the user's preference).

In Step 314, upon receiving the DI agent, the controller executes the DI agent on the client. In Step 316, the DI agent collects a second dataset associated with the client. In one or more embodiments, the second dataset may include the same information included in the signed dataset. Thereafter, the DI agent provides the second dataset to the controller.

Turning now to FIG. 3.2, the method shown in FIG. 3.2 may be executed by, for example, the above-discussed controller. Other components of the system (100) illustrated in FIG. 1.1 may also execute all or part of the method shown in FIG. 3.2 without departing from the scope of the embodiments disclosed herein.

In Step 318, the controller sends the second dataset to the GMS module, where the GMS module continues to perform the remaining part of the "DI for the client" stage (see FIG. 3.3).

In Step 320, after the client is rebooted, the user (via the controller) retrieves an OV from a VMS module (e.g., 127, FIG. 1.1). Details of the OV are described above in reference to FIGS. 2.1 and 2.2. In Step 322, the user, via the controller, uploads the OV to the orchestrator (e.g., 129, FIG. 1.1). In Step 324, as a security measure, the user (via the controller) verifies the signed dataset in the OV (e.g., signed device inventory details in the OV, see FIGS. 2.1 and 2.2) to complete the FDO device onboarding (e.g., the TO2).

In Step 326, based on Step 324, the controller makes a first determination (in real-time or near real-time) as to whether the signed dataset is verified (in the OV). Accordingly, in one or more embodiments, if the result of the first determination is NO, the method proceeds to Step 328. If the result of the first determination is YES, the method alternatively proceeds to Step 330.

In Step 328, as a result of the first determination in Step 326 being NO, the TO2 fails and provisioning of the client is terminated (e.g., the client cannot become an FDO compliant device). Based on that, the controller initiates notification of the user, via the GUI of the client, about the terminated onboarding of the client.

In one or more embodiments, the method may end following Step 328.

In Step 330, as a result of the first determination in Step 326 being YES, the TO2 does not fail and provisioning of the client is completed (e.g., the client becomes an FDO compliant device). In Step 332, based on Step 330, the controller initiates notification of the user, via the GUI of the client, about the completed/successful onboarding of the client.

In one or more embodiments, the method may end following Step 332.

Turning now to FIG. 3.3, the method shown in FIG. 3.3 may be executed by, for example, the above-discussed GMS module. Other components of the system (100) illustrated in FIG. 1.1 may also execute all or part of the method shown in FIG. 3.3 without departing from the scope of the embodiments disclosed herein.

In Step 334, as an additional security measure (e.g., to make sure that the client is indeed the correct client that needs to become an FDO compliant device), the GMS module compares/verifies the second dataset (received in Step 318 of FIG. 3.2) against the signed dataset (received in Step 310 of FIG. 3.1). While comparing, the GMS module may use the public key received in Step 300 of FIG. 3.1.

In Step 336, based on Step 334, the GMS module makes a second determination (in real-time or near real-time) as to whether the second dataset matches the signed dataset. Accordingly, in one or more embodiments, if the result of the second determination is NO, the method proceeds to Step 338. If the result of the second determination is YES, the method alternatively proceeds to Step 340.

In Step 338, as a result of the second determination in Step 336 being NO, the DI of the client fails. Based on that, the GMS module initiates notification of the user, via the GUI of the client, about the terminated DI of the client.

In one or more embodiments, the method may end following Step 338.

In Step 340, as a result of the second determination in Step 336 being YES, the GMS module generates the OV based on the signed dataset. In Step 342, the GMS module sends the OV to the VMS module.

In one or more embodiments, the method may end following Step 342.

Turning now to FIG. 4, FIG. 4 shows a diagram of a computing device in accordance with one or more embodiments disclosed herein.

In one or more embodiments disclosed herein, the computing device (400) may include one or more computer processors (402), non-persistent storage (404) (e.g., volatile memory, such as RAM, cache memory), persistent storage (406) (e.g., a non-transitory computer readable medium, a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) (402) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for onboarding a client, the method comprising:

sending a registration request to a global manufacturing service (GMS) module to register the client, wherein the request comprises at least a public key that is a pair of a private key;

in response to the request, receiving a GMS agent from the GMS module;

executing the GMS agent on the client to collect a dataset associated with the client;

initiating, by a controller of the client, displaying of the dataset to a user of the client, wherein, using the private key, the user signs the dataset to generate a signed dataset;

sending the signed dataset to the GMS module, wherein, in response to the sending the signed dataset, a device initialization (DI) agent is received from the GMS module;

executing the DI agent on the client to collect a second dataset associated with the client;

sending the second dataset to the GMS module, wherein, in response to the sending the second dataset, a notification is received, wherein the notification specifies that first data items of the second dataset match to second data items of the signed dataset, and wherein the notification further specifies that the first data items are verified against the second data items;

performing, by the GMS module and after receiving the second dataset, DI for the client by:

comparing, by the GMS module and using the public key, the second dataset against the signed dataset, making a first determination, by the GMS module, that the second dataset matches the signed dataset, generating, in response to the first determination and based on the signed dataset, an ownership voucher (OV), and sending, by the GMS module, the OV to a voucher management service (VMS) module;

retrieving, based on the notification, the an ownership voucher (OV) OV from the voucher management service (VMS) VMS module;

making a second determination that the OV comprises the signed dataset; and completing, based on the second determination, the onboarding of the client.

2. The method of claim 1, wherein the onboarding of the client is converting the client into a Fast Identity Online (FIDO) Device Onboard (FDO) compliant client.

3. The method of claim 1, wherein the dataset comprises at least one selected from a group consisting of an identifier of a storage device, an input/output memory management unit configuration of a second storage device, a second identifier of a data processing unit, a trusted platform module (TPM) endorsement certificate associated with the client, a serial number of the client, and a third identifier of a network interface card.

4. The method of claim 1, wherein the public key is used by the GMS module to verify the signed dataset.

5. The method of claim 1, wherein the OV comprises at least one selected from a group consisting of the signed dataset, information about a version of a Fast Identity Online (FIDO) Device Onboard (FDO) protocol, a header, an entry array, and a device certificate chain, wherein the device certificate chain comprises the signed dataset.

6. The method of claim 1, wherein the OV comprises at least one selected from a group consisting of the signed dataset, information about a version of a Fast Identity Online (FIDO) Device Onboard (FDO) protocol, a header, an entry array, and a device certificate chain, wherein the entry array comprises the signed dataset.

7. A non-transitory computer-readable medium comprising computer-readable program code, which when executed by a computer processor enables the computer processor to perform a method for onboarding a client, the method comprising:

sending a registration request to a global manufacturing service (GMS) module to register the client, wherein the request comprises at least a public key that is a pair of a private key;

in response to the request, receiving a GMS agent from the GMS module;

executing the GMS agent on the client to collect a dataset associated with the client;

initiating, by a controller of the client, displaying of the dataset to a user of the client, wherein, using the private key, the user signs the dataset to generate a signed dataset;

sending the signed dataset to the GMS module, wherein, in response to the sending the signed dataset, a device initialization (DI) agent is received from the GMS module;

executing the DI agent on the client to collect a second dataset associated with the client;

sending the second dataset to the GMS module, wherein, in response to the sending the second dataset, a notification is received, wherein the notification specifies that first data items of the second dataset match to second data items of the signed dataset, and wherein the notification further specifies that the first data items are verified against the second data items;

performing, by the GMS module and after receiving the second dataset, DI for the client by:

comparing, by the GMS module and using the public key, the second dataset against the signed dataset, making a first determination, by the GMS module, that the second dataset matches the signed dataset, generating, in response to the first determination and based on the signed dataset, an ownership voucher (OV), and sending, by the GMS module, the OV to a voucher management service (VMS) module;

retrieving, based on the notification, the an ownership voucher (OV) OV from the voucher management service (VMS) VMS module;

making a second determination that the OV comprises the signed dataset; and completing, based on the second determination, the onboarding of the client.

8. The non-transitory computer-readable medium of claim 7, wherein the onboarding of the client is converting the client into a Fast Identity Online (FIDO) Device Onboard (FDO) compliant client.

9. The non-transitory computer-readable medium of claim 7, wherein the dataset comprises at least one selected from a group consisting of an identifier of a storage device, an input/output memory management unit configuration of a second storage device, a second identifier of a data processing unit, a trusted platform module (TPM) endorsement certificate associated with the client, a serial number of the client, and a third identifier of a network interface card.

10. The non-transitory computer-readable medium of claim 7, wherein the public key is used by the GMS module to verify the signed dataset.

11. The non-transitory computer-readable medium of claim 7, wherein the OV comprises at least one selected from a group consisting of the signed dataset, information about a version of a Fast Identity Online (FIDO) Device Onboard (FDO) protocol, a header, an entry array, and a device certificate chain, wherein the device certificate chain comprises the signed dataset.

12. The non-transitory computer-readable medium of claim 7, wherein the OV comprises at least one selected from a group consisting of the signed dataset, information about a version of a Fast Identity Online (FIDO) Device Onboard (FDO) protocol, a header, an entry array, and a device certificate chain, wherein the entry array comprises the signed dataset.

13. A system for onboarding a client, the system comprising:

the client;

a global manufacturing service (GMS) module; and a voucher management service (VMS) module, wherein the client is programmed to:

send a registration request to the GMS module to register the client, wherein the request comprises at least a public key that is a pair of a private key;

in response to the request, receive a GMS agent from the GMS module;

execute the GMS agent on the client to collect a dataset associated with the client;

initiate, by a controller of the client, displaying of the dataset to a user of the client, wherein, using the private key, the user signs the dataset to generate a signed dataset;

send the signed dataset to the GMS module, wherein, in response to the sending the signed dataset, a device initialization (DI) agent is received from the GMS module;

execute the DI agent on the client to collect a second dataset associated with the client;

send the second dataset to the GMS module, wherein, in response to the sending the second dataset, a notification is received, wherein the notification specifies that first data items of the second dataset match to second data items of the signed dataset, and wherein the notification further specifies that the first data items are verified against the second data items;

perform, by the GMS module and after receiving the second dataset, DI for the client by:

compare, by the GMS module and using the public key, the second dataset against the signed dataset, make a first determination, by the GMS module, that the second dataset matches the signed dataset, generate, in response to the first determination and based on the signed dataset, an ownership voucher (OV), and send, by the GMS module, the OV to a voucher management service (VMS) module;

retrieve, based on the notification, the an ownership voucher (OV) OV from the VMS module;

make a second determination that the OV comprises the signed dataset; and complete, based on the second determination, the onboarding of the client.

14. The system of claim 13, wherein the onboarding of the client is converting the client into a Fast Identity Online (FIDO) Device Onboard (FDO) compliant client.

15. The system of claim 13, wherein the dataset comprises at least one selected from a group consisting of an identifier of a storage device, an input/output memory management unit configuration of a second storage device, a second identifier of a data processing unit, a trusted platform module (TPM) endorsement certificate associated with the client, a serial number of the client, and a third identifier of a network interface card.

16. The system of claim 13, wherein the OV comprises at least one selected from a group consisting of the signed dataset, information about a version of a Fast Identity Online (FIDO) Device Onboard (FDO) protocol, a header, an entry array, and a device certificate chain, wherein the device certificate chain comprises the signed dataset.

17. The system of claim 13, wherein the OV comprises at least one selected from a group consisting of the signed dataset, information about a version of a Fast Identity Online (FIDO) Device Onboard (FDO) protocol, a header, an entry array, and a device certificate chain, wherein the entry array comprises the signed dataset.

* * * * *